(12) United States Patent
Riedel et al.

(10) Patent No.: US 12,350,894 B2
(45) Date of Patent: Jul. 8, 2025

(54) FIBRE COMPOSITE MATERIAL AND METHOD FOR PRODUCING SAME

(71) Applicant: manaomea GmbH, Munich (DE)

(72) Inventors: Ulrich Riedel, Mering (DE); Christine Arlt, Mering (DE)

(73) Assignee: manaomea GmbH, Munich (DE)

( * ) Notice: Subject to any disclaimer, the term of this patent is extended or adjusted under 35 U.S.C. 154(b) by 0 days.

(21) Appl. No.: 17/792,629

(22) PCT Filed: Jan. 13, 2021

(86) PCT No.: PCT/DE2021/000004
§ 371 (c)(1),
(2) Date: Jul. 13, 2022

(87) PCT Pub. No.: WO2021/143974
PCT Pub. Date: Jul. 22, 2021

(65) Prior Publication Data
US 2023/0037371 A1   Feb. 9, 2023

(30) Foreign Application Priority Data
Jan. 13, 2020   (DE) .................. 10 2020 000 109.2

(51) Int. Cl.
*B32B 3/28*   (2006.01)
*B29C 70/22*  (2006.01)
(Continued)

(52) U.S. Cl.
CPC .............. *B29C 70/42* (2013.01); *B29C 70/22* (2013.01); *B32B 3/28* (2013.01); *B32B 5/024* (2013.01);
(Continued)

(58) Field of Classification Search
CPC .. B32B 3/28; B32B 3/30; B32B 5/024; B32B 5/026; B32B 5/028; B32B 5/26; B32B 27/12; B32B 2307/546; B32B 2307/538
See application file for complete search history.

(56) References Cited

U.S. PATENT DOCUMENTS 5,405,021 A   4/1995  Smithson
7,470,453 B1 * 12/2008  Lewis ................. D06N 3/186
                                                    427/407.1
(Continued)

FOREIGN PATENT DOCUMENTS

DE          4141185 A1    6/1993
DE    102011075720 A1   11/2012
(Continued)

OTHER PUBLICATIONS

Machine translation of JP 2016 159615 A obtained from Google Patents on Oct. 7, 2024.*
(Continued)

*Primary Examiner* — Joanna Pleszczynska
(74) *Attorney, Agent, or Firm* — Meunier Carlin & Curfman LLC (57) ABSTRACT

The present invention relates to fiber composite plastic (11, 13) comprising a polymer (40, 41) and at least one textile (50), which has at least one palpably inhomogeneous surface (60, 61) with a textile structure and is entirely surrounded by polymer (40, 41), wherein the fiber composite plastic (11, 13) has at least one palpably inhomogeneous surface (60, 61), wherein inhomogeneities of this fiber composite plastic surface are caused by the textile structure, and a method for producing the fiber composite plastic (11, 13).

21 Claims, 4 Drawing Sheets

(51) Int. Cl.

| | | |
|---|---|---|
| *B29C 70/42* | (2006.01) | |
| *B32B 3/30* | (2006.01) | |
| *B32B 5/02* | (2006.01) | |
| *B32B 5/06* | (2006.01) | |
| *B32B 5/26* | (2006.01) | |
| *B32B 7/12* | (2006.01) | |
| *B32B 27/12* | (2006.01) | |
| *B29K 61/00* | (2006.01) | |
| *B29K 67/00* | (2006.01) | |
| *B29K 105/26* | (2006.01) | |
| *B29K 267/00* | (2006.01) | |
| *B29K 311/10* | (2006.01) | |
| *B29L 31/00* | (2006.01) | |
| *B29L 31/44* | (2006.01) | |

(52) U.S. Cl.
CPC .............. *B32B 5/026* (2013.01); *B32B 5/028* (2013.01); *B32B 5/073* (2021.05); *B32B 5/26* (2013.01); *B32B 7/12* (2013.01); *B29K 2061/00* (2013.01); *B29K 2067/00* (2013.01); *B29K 2105/26* (2013.01); *B29K 2267/00* (2013.01); *B29K 2311/10* (2013.01); *B29K 2313/00* (2013.01); *B29K 2995/0072* (2013.01); *B29K 2995/0082* (2013.01); *B29L 2031/44* (2013.01); *B29L 2031/722* (2013.01); *B29L 2031/732* (2013.01); *B32B 2260/023* (2013.01); *B32B 2260/046* (2013.01); *B32B 2262/0276* (2013.01); *B32B 2262/062* (2013.01); *B32B 2262/065* (2013.01); *B32B 2307/538* (2013.01); *B32B 2307/546* (2013.01); *B32B 2451/00* (2013.01); *B32B 2471/00* (2013.01); *B32B 2479/00* (2013.01)

(56) References Cited

U.S. PATENT DOCUMENTS

| | | | |
|---|---|---|---|
| 2004/0031952 A1 | 2/2004 | Oosedo | |
| 2007/0137787 A1* | 6/2007 | Howland | ............ B32B 37/1207 |
| | | | 156/244.11 |
| 2013/0029100 A1 | 1/2013 | Espe | |
| 2014/0030483 A1* | 1/2014 | Howland | ................ B32B 27/34 |
| | | | 428/141 |
| 2014/0242871 A1* | 8/2014 | Yasui | ..................... B32B 17/04 |
| | | | 442/412 |
| 2019/0001650 A1* | 1/2019 | Sohn | ....................... B32B 5/024 |

FOREIGN PATENT DOCUMENTS

| | | |
|---|---|---|
| DE | 202012011048 U1 | 3/2013 |
| EP | 2875944 A1 | 5/2015 |
| EP | 3578356 A1 | 12/2019 |
| JP | 2016159615 A | 9/2016 |
| WO | 2018107288 A1 | 6/2018 |

OTHER PUBLICATIONS

International Search Report and Written Opinion received in PCT/DE2021/000004 dated Apr. 1, 2021, 7 pages.
Wikipedia, Prepreg. Feb. 2019. URL: https://de.wikipedia.org/w/index.php?title=Prepreg&oldid=185763860.
FVK-Gmbh, Fertigungsverfahren Oct. 2019. URL: http://www.fvk-dessau.de/technologie_fertigungsverfahren.html#3.

* cited by examiner

FIBRE COMPOSITE MATERIAL AND METHOD FOR PRODUCING SAME

The invention presented relates to a fiber composite material and a method for producing same.

Various fiber composite plastics and methods for producing these fiber composite plastics are currently known. A plurality of different fibers with different materials as a matrix can be combined to form a composite material. These fiber composite plastics usually only fulfill a carrying or stability function and are additionally provided with a decorative surface in order to be visually appealing to the user.

Plates, profiles or molded parts are usually manufactured as blanks and then provided with a decorative surface. In the production of molded wood fiber products, such as MDF (medium density fiberboard), the short wood fibers are glued, dried, and then scattered in a plate-shaped mold and baked under pressure. This is how the panel is created, which is usually provided with a decorative surface for furniture construction and other similar visible applications. A number of procedures exist for this purpose. Often papers with corresponding decorative sides are glued with a resin and glued to the boards. Typical applications for this include kitchen counter tops. Alternatively, the sheets can be laminated with thermoplastic films. To do this, the film is heated to activate the adhesive. The board is then coated with it in a veneer press. The board, often referred to as the substrate, is responsible for the stability or load-bearing function, and the decorative layer is responsible for the design.

Plastic moldings for automotive engineering are typically manufactured using the back injection molding process. For this purpose, a decorative material is used and back-injected with melted plastic. In other common processes, decorative materials are used and then back-pressed with a thermoplastic natural fiber composite that has been previously melted. In these processes, too, the load-bearing function is generated by the back-molded or back-pressed material, and the decorative material is used to add the design.

In composites or fiber composite plastics, the lightweight material, usually a glass fiber or carbon-fiber-reinforced plastic, is molded as the supporting structure. In aircraft or other lightweight construction applications such as Formula 1 or in shipbuilding, the material is then coated with a paint to protect the material from environmental conditions and to display the design. In shipbuilding for boat hulls, it is well known that a gelcoat, i.e. a strongly filled reactive resin, is applied. This takes over the protective function, for example, to protect against moisture or UV radiation. The actual load-bearing fiber composite material is then inserted into this material, which has not yet fully cured or hardened.

One exception is the visible carbon-fiber-reinforced roofs of some cars, which are not covered with a decorative layer. In this process, the resins are treated with appropriate additives, for example to achieve UV resistance. These components are also designed in such a way that they achieve a so-called Class A surface, i.e. they are extremely smooth and shiny, while no fiber markings can be felt on the surface. Only closed surface layers are used here, which are already provided with binders in such a way that they cannot crease or wrinkle. These so-called preforms are already shaped similarly to the end product geometry, with the fibers already oriented to deal with the loads in the application. Due to the binding, the fiber orientation remains stable enough for the manufacturing process.

The utility model DE 20 2012 011 048 U1 shows a panel, such as a floor covering panel, wall or ceiling covering panel, furniture component panel, housing panel, cover panel or dry lining panel, and/or a facade, panel or plank element, a screen or the like, having a panel base body and at least one wear layer applied to the panel base body, wherein a textile sheet material forming the outer side of the wear layer, wherein the textile sheet material has a layer thickness of between 0.2 and 0.8 mm and the panel base body has a thickness of 0.6 to 10 mm.

The utility model DE 20 2010 006 959 U1 shows a material panel, in particular for the production of furniture, floor coverings or door elements, which comprises at least a central substrate layer and a decorative layer on at least one side of the substrate layer, wherein the decorative layer has adjacent adjoining regions which at least partially have a decorative and/or structural course with different directions.

In DE 10 2011 075 720 A1, a support-less interior part for a vehicle is shown that has a haptic layer made of textile, wherein a stiffening material is introduced into the textile in such a way that the textile is at least partially stiffened, wherein the depth of introduction of the stiffening material is always such that a haptic zone is retained on the decorative side of the textile.

Based on the known state of the art, it is an objective of the present invention to provide a fiber composite plastic and a process for producing the same, wherein the fiber composite plastic simultaneously fulfills a stability function and a design function, and the process for producing the fiber composite plastic can be carried out as simply and economically as possible.

The task is solved by a fiber composite plastic according to the present claims. Advantageous further developments can also be seen from the present description and the figures.

Accordingly, a fiber-composite plastic is provided which comprises a polymer and at least one textile, which has at least one palpably inhomogeneous textile surface with a textile structure and is preferably completely surrounded by polymer, and wherein the fiber composite plastic has at least one palpably inhomogeneous fiber-composite plastic surface, wherein the inhomogeneities of this fiber composite plastic surface are due to the textile structure. Herein, the textile structure results from a weaving or knitting pattern or another way of linking fibers or yarns.

Molded parts, sheets, profiles, furniture and other articles for daily use can be made from the fiber composite plastic according to the invention.

As the fiber composite plastic has at least one palpably inhomogeneous surface, wherein inhomogeneities in this fiber composite plastic surface are caused by the textile structure, a fiber composite material is provided which simultaneously fulfills a stability or carrying function and a design function.

The fiber composite plastic or the molded parts, sheets, profiles, furniture or other articles of daily use made from the fiber composite plastic therefore have a new and, above all, authentic appearance, wherein the haptic experience matches the appearance, since the structure of the textiles used can be felt on the surface of the fiber composite plastic. Of course, these inhomogeneities can also have technical functions, e.g. a rough surface can have an anti-slip effect. This new and authentic appearance is achieved without an additional step of applying a decorative layer, saving additional processing steps and materials.

Fiber composite plastics are materials that comprise, and generally consist of, fibers and a polymer, i.e. a plastic matrix. The matrix surrounds the fibers, which are bound to the matrix by adhesive interactions.

Due to the use of fiber materials, fiber composite plastics have a direction-dependent elasticity behavior.

The fibers in the fiber composite plastic according to the invention are at least partly in the form of a textile.

In the context of the invention, a textile is defined as an at least two-dimensional textile structure which is produced from a number of linear textile structures (usually yarns, but also fibers in the case of non-woven fabrics) connected to one another. Yarns can be made from one or more fibers. Here, two-dimensional means that the length and width of the textile are greater than the thickness of the textile.

In connection with the invention, the underside and/or the top side of the flat textile is referred to as the surface of the textile.

At least two-dimensional or flat means that a spatial textile structure (for example, a textile tube or stocking) can also be used. In this context, both inner and outer surfaces can be referred to as surfaces.

For the invention, a textile is used which has at least one palpably inhomogeneous textile surface with a textile structure. Often both surfaces of textiles have a palpably inhomogeneous textile surface with a textile structure, wherein the structures of the two surfaces are often similar or reciprocal to each other. However, the surfaces of a textile can also differ significantly from each other, for example in the case of embroidered textiles or textile textured wallpaper or carpets. Therefore, the orientation of the textile in the fiber composite plastic can affect the surface structure of the fiber composite plastic and should be selected accordingly. In general, the side of the textile facing the outside of the fiber composite plastic will characterize the surface of the fiber composite plastic the most.

In the context of the invention, an inhomogeneous surface is understood to be a surface which is not smooth but has a palpable structure. The inhomogeneity of the textile therefore presupposes a palpable structure or palpable unevenness and/or pattern. This can result, for example, from a weaving or knitting pattern or some other way of linking fibers or yarns. Preferably, inhomogeneity of the textile means that the textile used has a plurality of height differences of at least 0.02 mm, preferably 0.05-3 mm, optionally 1-2 mm, measured with a caliper gauge.

According to Wikipedia (https://de.wikipedia.org/wiki/Oberflächengüte)palpable inhomogeneity means an arithmetic average of the roughness profile $R_a$ of 3.2 µm or more. The surface may therefore have a arithmetic average of the roughness profile of at least 3.2 µm, at least 4 µm, at least 10 µm, at least 25 µm, at least 100 µm, at least 200 µm, or at least 750 µm. Optionally, the maximum arithmetic average of the roughness profile is 5 mm. An average peak-to-valley height $R_z$ (frequently described with a height difference in the invention) of approximately 12.2 µm corresponds to an arithmetic average of the roughness profile of 3.2 µm (https://www.technisches-zeichnen.net/technisches-zeichnen/diverses/rauheit-fertigungsverfahren.php). This roughness is palpable and can also be perceived visually.

According to the invention, the at least one palpably inhomogeneous fiber composite plastic surface, for example the manufactured surfaces of molded parts, panels, profiles, furniture and other articles of daily use, has, for example, the following arithmetic average of the roughness profile $R_a$:
  at least 3.2 µm on 100% of a surface, or
  at least 80% of a surface at least 4 µm, or
  at least 20% of a surface at least 25 µm or
  at least 50% of a surface at least 10 µm or
  at least 50% of a surface at least 200 µm or
  at least 750 µm on 100% of a surface,
  preferably on at least 30% of a surface between 25-50 µm on the rest of the surface at least 3.2 µm.

The corresponding average peak-to-valley heights $R_z$ are, for example, around % of the arithmetic average of the roughness profile.

The macrostructure of a surface can be flat, but it does not have to be. If corresponding manufacturing processes and suitable textiles are used, rounded, wavy or angular surfaces of the manufactured fiber composite plastic are possible. Macrostructure refers to structures with height differences of, for example, more than 0.5 cm However, the palpably inhomogeneous microstructure of the fiber composite plastic surface (i.e., for example, height differences of less than 0.5 cm) is essential for the invention.

The fiber composite plastic can be manufactured with a single textile, but it is also possible that several textiles are processed, wherein these textile layers can be arranged on top of each other and/or next to each other in the fiber composite plastic. In general, "a" or "an" in the context of the present invention means "one or more", for example one or two or 1-50, 2-20, or 5-10, unless otherwise specified.

All kinds of textiles with all kinds of rough surfaces can be used. For example, bed sheets with a relatively low roughness or patchwork rugs with a relatively high roughness can be used.

With the aid of the process according to the invention, it is possible, by using at least one textile with at least one inhomogeneous surface, to produce a fiber composite material which has at least one palpably inhomogeneous surface, wherein inhomogeneities of this fiber composite surface are caused by the textile structure. Furthermore, the fiber composite material according to the invention fulfills a supporting or stabilizing function and a design function at the same time.

Inhomogeneity of the surface of the fiber composite plastic means that the finished fiber composite plastic has a plurality of height differences of at least 0.01 mm, preferably 0.01-0.5 mm, measured by the method explained above, on at least one surface. Inhomogeneities of the fiber composite plastic surface are caused by the textile structure. Most, preferably essentially all or in fact all inhomogeneities of the fiber composite plastic surface are due to the textile structure. Therefore, all the inhomogeneities of the textile can, but do not have to, be reproduced on the surface of the finished fiber composite plastic. It is also possible, for example, that only coarser inhomogeneities (for example height differences of 0.7-3 mm) of the textile are found as inhomogeneities on the surface of the fiber composite and are therefore palpable, while smaller inhomogeneities are covered by polymer in such a way that they are not palpable on the surface of the finished fiber composite. Typically, the roughness of the fiber composite plastic surface will be less than the roughness of the textile surface closest to the surface (top or bottom). Preferably, a large part (more than 50% of the area, preferably more than 60% of the area, more than 70% of the area, more than 80% of the area or more than 90% of the area or essentially the entire surface is inhomogeneous.

These inhomogeneities on the fiber composite plastic surface are clearly perceptible to the touch. For example, the above-described palpable structures or palpable irregularities and/or patterns of the textile are partially or completely palpable on the fiber composite plastic surface, for example when fingers are brushed over it.

The matrix used in the fiber composite plastic according to the invention is a polymer, wherein this acts as a binder. It is used, for example, to support the fibers of the textile and to distribute the forces acting on moldings, panels, profiles, furniture or other articles of daily use made of the fiber composite plastic.

The textiles of the fiber composite plastic or their fibers are completely or substantially completely enclosed by polymer in the finished product. Completely enclosed is understood in the context of the invention to mean that the surfaces of the fiber composite plastic are not open-pored. The surfaces of the fiber composite plastic are therefore completely or essentially completely impregnated or covered with polymer. "Essentially complete" means that the finished fiber composite plastic may have processing defects such as that the fibers used are partially not covered by polymer, wherein preferably more than 95%, more preferably more than 99% or more than 99.9% of the surface is covered by polymer.

The fact that the fibers of the fiber composite plastic are completely enclosed in polymer gives the fiber composite plastic a surface that is visually attractive and at the same time protected against environmental influences, moisture, heat and mechanical stresses.

The textile is preferably a used textile or textile waste. Used textiles are any type of textiles that have been used in any way. Used textiles include, for example, used coffee sacks, bed sheets, curtains, carpets, towels, cleaning rags, or any type of clothing such as cloth trousers, jeans, T-shirts, shirts, scarves, shawls, underwear, socks or dresses, technical textiles, textile insulation materials or parts thereof. Textile waste is generated, for example, in the production of textiles as leftovers from cuttings, punching residues, residual webs, selvedges or in the form of unused textiles that are not for sale or have not been sold.

Used textiles and, if necessary, also textile waste are preferably washed or cleaned before use in the context of the invention, as this ensures better adhesion to the polymer. For some combinations of textiles and polymers, further pretreatment, e.g. with a wetting agent, may be useful.

Other processing, e.g. cutting, such as unraveling pieces or cutting off seams, is also possible.

By giving preference to used textiles and/or textile waste, a new use is created for the huge quantities of used textiles and textile waste generated each year, which at the same time helps to conserve resources. Of course, new textiles, for example those produced especially for this purpose, can also be used according to the invention.

In a preferred embodiment, the textile is selected from the group consisting of woven fabric, knitted fabric, such as knitted or crocheted fabric, braided fabric, nonwoven fabric, and scrim. Woven fabrics are textiles formed from threads of two thread systems crossing at right angles. This can include e.g. carpets, such as patchwork rugs. Knitted fabrics are fabrics in which the fibers are in the form of stitches in the textile structure. Due to their high flexibility, knitted fabrics are preferably used where high deep-drawability or drapability as well as shock absorption is required. T-shirts, for example, are typically knitted fabrics. A braid, similar to fabric, describes a structure in which two fiber directions cross each other. Non-woven fabrics consist of random long or short fibers, wherein short fibers have a length<3 mm and long fibers have a length of >3 mm. Felts can also be used. A scrim describes a unidirectional fiber material consisting of strictly parallel fiber strands (so-called rovings), so that a flat textile is present. The adjacent fibers are fixed with a sewing thread. Due to the unidirectional, parallel position of the fibers, higher mechanical strengths can be achieved than with fabrics. Lace or tufting or mixtures of different types of textile can also be used.

Optionally, the fiber composite plastic comprises multiple identical (e.g., multiple layers of sheet or sheet pieces) or different (e.g., one or more layers of sheet pieces and one or more layers of curtain or towel) textiles, e.g., if greater stability is to be achieved. These multiple identical or different textiles can be arranged next to each other and/or on top of each other in the fiber composite plastic. The orientation of the fibers between the several identical or different textiles can be selected in such a way that the fibers of different textile layers each have an angle of 0-90° to one another.

By using several textiles, uniform reinforcement layers can be built up, which do not have any weak points. Alternatively, it is also possible to selectively use several layers of textile and/or other fabrics or textile pieces at points where a greater reinforcing effect, such as greater flexural strength, is desired.

Textiles can, for example, be laid in pieces in such a way that overlaps occur and forces can therefore be transmitted.

Several identical or different textiles can be connected to one another by binding processes such as sewing, gluing, welding and ironing, generally before contact with the polymer, but also after contact with a polymer, e.g. in the form of prepregs. Other processes suitable for joining textiles together are also applicable. Joining is advantageous, for example, if an arrangement of the textiles essentially next to each other (i.e. in the plane of the relevant inhomogeneous surface, optionally with overlaps) is desired, for example to ensure a two-dimensional coverage of the entire surface with textiles. When textiles are arranged one on top of the other, joining can be advantageous, for example, if certain patterns are to be achieved. It is also possible to achieve a connection only through the polymer, i.e. without previously connecting the textiles.

Different types of textiles or different large pieces of textiles can be bonded together in any way, wherein an attractive design can be created and/or the orientation of the fibers in different textile layers can be selected in such a way that optimum flexural strength can be achieved for the corresponding load on the object made from the fiber composite plastic.

In a preferred embodiment, at least one textile of the fiber composite plastic comprises natural fibers, optionally all textiles comprised in the fiber composite plastic. Natural fibers are fibers that come from natural sources such as plants, animals or minerals and can be used directly without chemical conversion reactions. The natural fibers can be natural plant fibers such as cotton, linen, coos, flax, hemp, nettle, kapok, ramie, sisal, jute, kenaf, abaca, coconut or manila, or natural animal fibers such as wool, silk, angora, cashmere, vicuña, llama, alpaca, camel, mohair or horsehair or mixtures thereof. In one embodiment, the textile comprises man-made fibers. Man-made fibers are fibers produced artificially by chemical-technical processes from natural or synthetic polymers or from inorganic substances. Man-made fibers are mainly produced in the form of filaments (mono-filaments or multi-filaments) and processed into filament yarns or into staple fibers by cutting or tearing and then spun into yarns by secondary spinning processes or, for example, processed directly into textile fabrics by non-woven production processes. The man-made fibers can be, for example, man-made fibers made from natural polymers such as polymers, viscose, cupro, modal, lyocell, acetate, triacetate, polynosic, or man-made fibers made from synthetic polymers such as polyester, polyamide, polyacrylic, elastane, polypropylene or polyurethane.

Of course, the at least one textile can also comprise natural fiber and man-made fiber, or textiles of natural fiber and textiles of man-made fiber and/or textiles of natural fiber and man-made fiber can be used to adjust a fiber composite plastic according to the invention.

In one embodiment, the textiles in the fiber composite plastic are biodegradable. In one embodiment, the fiber composite plastics of the invention do not comprise carbon fibers or textiles thereof.

The textile preferably increases the flexural strength of the fiber composite plastic. The flexural strength is preferably at least 30 MPa in at least one direction, typically in several directions, at least in 0° and at least 30 MPa, preferably 45-400 MPa, in 90°. Flexural strength can be determined, for example, with a normal tension-compression test device.

The flexural strength can be influenced, for example, by the type of textile used, e.g. woven, knitted, braided, non-woven and/or scrim. The flexural strength can also be influenced by the number of textile layers or the thickness of the individual textile layers and the orientation of the fibers of individual textile layers to one another.

The fiber composite plastic may further comprise reinforcing fibers, preferably natural fibers, present as linear structures. In this case, reinforcing fibers are introduced in addition to the at least one structuring textile, which causes inhomogeneities of the fiber composite plastic surface. These reinforcing fibers can increase the stability of the fiber composite plastic. The reinforcing fibers can be arranged at any point on the at least one textile and/or be connected to the at least one textile at any point. Binding processes to join the reinforcing fibers can be e.g. sewing, weaving, gluing, welding, and ironing.

However, other processes are also applicable, which are suitable for joining reinforcing fibers and textiles together. Reinforcing fibers can also be introduced exclusively or additionally into areas of the fiber composite plastic that are not covered by the surface of the textile, such as when using clothing that does not cover the entire surface of the fiber composite plastic. Reinforcement fibers do not have to be bonded to the fabric or textiles prior to contact with the polymer. They can also, for example, be mixed with the polymer before it comes into contact with the fabric or textiles.

By using reinforcing fibers in addition to the textile, the stability or flexural strength of the fiber composite plastic can be increased to meet the requirements, if necessary.

The polymer can be a thermoset, elastomer or thermoplastic. Preferably, the polymers in the context of the invention are thermosetting plastics.

Thermosetting plastics are plastics that cannot be deformed by heating after they have hardened by heating. The thermoset plastic can be, for example, a synthetic resin selected from the group which comprises epoxy resin, unsaturated polyester resin, acrylate resins and/or methacrylate resins and/or mixtures with comonomers thereof, for example also based on renewable raw materials such as acrylated vegetable oils, for example acrylated linseed oil or acrylated soybean oil, for example Mercryl-S and Mercryl LT from Hobum Oleochemicals, or Photomer 3005 F from Cogni, itaconic acid resins, polyurethane resins, vinyl ester resins, furan resins, phenol-formaldehyde resins and melamine resins. Before processing, the thermosetting plastic is preferably in liquid form or in the form of fusible granules, fusible powders fusible films, liquid polymer solutions, liquid polymer dispersions, which are then melted for use.

Thermoplastics are plastics that can be deformed within a certain temperature range. This process is reversible, which means that it can be repeated as often as desired by cooling and reheating to the molten state as long as the so-called thermal decomposition of the material does not set in due to overheating. The thermoplastic may be selected, for example, from the group which comprises acrylonitrile butadiene styrene (ABS), polyamide (PA), polylactic acid (PLA), polymethyl methacrylate (PMMA), polycarbonate (PC), polyethylene terephthalate (PET), polybutylene terephthalate (PBT), polyethylene furanoate (PEF), polyethylene (PE), polypropylene (PP) or other polyolefin, polystyrene (PS), polyetheretherketone (PEEK) und polyvinylchloride (PVC), cellulose acetate (CA), cellulose butyrate (CB), cellulose propionate (CP), cellulose acetopropionate (CAP) and cellulose acetobuytrate (CAB), polyalkonates such as polyhydroxybutyric acid and other biopolymers based on casein, starch, shellac, gelatin and other proteins, chitin, lignin (e.g., Arboform) and vegetable oils. The thermoplastic is usually in solid form before processing, such as films, granules, powders, tapes, yarns or monofilaments, wherein the thermoplastic is melted for use.

Elastomers are plastics that can temporarily change their shape through pressure or stretching. After concluding the pressure or stretching, the elastomer quickly resumes its original shape. The elastomers are wide-meshed cross-linked and therefore flexible. They do not soften when heated and are not soluble in most solvents. Elastomers include all types of crosslinked rubber, e.g. natural rubber (NR), acrylonitrile butadiene rubber (NBR), styrene butadiene rubber (SBR), chloroprene rubber (CR), butadiene rubber (BR) and ethylene propylene diene rubber (EPDM). Crosslinking takes place, for example, by vulcanization with sulfur, by means of peroxides, metal oxides or irradiation.

Today, plastics are still produced mainly on a petrochemical basis, and such plastics can be used in the context of the invention. In a preferred embodiment, the polymer is produced partially or preferably entirely from renewable raw materials. Examples of such so-called bioplastics are natural rubber, starch or starch derivatives or starch blends, cellulose products such as cellulose or cellulose acetate (CA), shellac, PLA, polyhydroxyalkanoates such as polyhydroxybutyric acid (PHB), polyethylene furanoate (PEF), lignin-based plastics such as Arboform, Ecovio (BASF), and polytrimethylene terephthalate (PTT, for example DuPont). Particularly preferred bioplastics are acrylated vegetable oils, for example acrylated linseed oil or acrylated soybean oil, for example Mercryl S and Mercryl LT from Oleochemicals, or Photomer 3005 F from Cognis; or itaconic acid resins. Resources can be saved by using bioplastics. Within the scope of the invention, bioplastics can be combined with textiles, preferably used textiles or textile waste, which for example comprise or consist of natural fibers. This means that the products manufactured can be produced in a particularly sustainable manner. They can also be particularly biodegradable. Alternatively, depending on the product to be manufactured, the most durable bioplastics possible can be selected.

The proportions of textile and polymer are selected such that as much polymer is added that the textile is completely enclosed by polymer. Advantageously, not significantly more polymer is generally added than is necessary for this. In the case of thermoplastics, thermal shrinkage must be taken into account herein, and thermal and reactive shrinkage in the case of thermosetting plastics.

In a preferred embodiment, the fiber volume content is 25-75% V/V, e.g. 25-65% V/V, preferably 35-50% V/V, most preferably about 45% V/V or less, optionally 40% VN or less.

Without intending to be bound by theory, the inventors assume that, particularly in a pultrusion process, a low fiber volume content contributes to creating an inhomogeneous surface. In a preferred embodiment the proportion of polymer, for example furan resin, is 25-75% V/V, preferably 50-65% V/V, most preferably about 55% V/V or more, optionally about 60% V/V or more.

The fiber volume content behaves reciprocally in relation to the proportion of polymer, i.e. the higher the fiber volume content, the lower the proportion of polymer and vice versa.

In a preferred embodiment, the textile to polymer ratio is 35-330% m/m, preferably about 116% m/m. 2 layers of towel textile with a basis weight of 218 g/m$^2$ and 2 layers of coffee sack textile with a basis weight of 417 g/m$^2$ are pressed together with a quantity of resin of 10.9 g to form a sheet with a thickness of 2 mm and an area of 20 cm$^2$. The amount of fiber is therefore 12.7 g. 12.7 g fibers divided by 10.9 g resin results in 116% fibers. In the context of the invention, about preferably means+/−10%. The density of the produced fiber composite plastic is preferably more than one 1 g/ml.

The invention further also provides a method of making a fiber composite plastic according to the invention, wherein the fiber composite plastic comprises a polymer and at least one textile having at least one palpably inhomogeneous textile surface having a textile structure and being completely enclosed by polymer, wherein the fiber composite plastic has at least one palpably inhomogeneous fiber composite plastic surface, wherein inhomogeneities of said fiber composite plastic surface are due to the textile structure.

Such a process or method may comprise the steps:
a) providing the textile as a blank,
b) impregnating the textile with a polymer, resulting in an impregnated blank,
c) strengthening, e.g., hardening, the blank.

Processes according to the invention generally either use a soft overlay layer or, preferably, use pultrusion to produce the fiber composite plastic according to the invention.

A pultrusion-based process according to the invention may comprise the steps:
a) providing at least one textile as a blank,
b) impregnating the at least one textile with a polymer in an immersion bath, thereby forming an impregnated blank,
c) drawing the at least one textile into a tool,
d) solidifying, for example curing, the blank in the mold.

To be suitable for pultrusion, the textile must have a length that exceeds the length of the finished workpiece, e.g. the length from the resin bath to the take-off device after the mold. In practice, this is often about 3-4 m. The textile may have been created by joining, e.g. sewing, several individual textiles, as described above.

In one embodiment, multiple textiles are used, either multiple identical textiles or multiple different textiles. For example, flat fabric scraps can be used, which can be in the form of stripes, selvages or waste textiles cut into stripes, in combination with yarns or without them. The yarns increase tensile strength, which facilitates pultrusion, especially when the textiles themselves do not have sufficient tensile strength.

The textiles can have a greater width than the width of the cavity of the mold, for example, bed sheets can be folded after impregnation or formed to the desired shape by a splitter. Textile strips with a width of 3-10, for example 4-5 cm, can also be used, or narrower textile strips corresponding to the width of the cavity.

According to the invention, it is not necessary to achieve uniform yarn tension, but is even advantageous not to apply the same tension to all textiles, and to apply more tension to those that can tolerate a higher tensile force.

Thermosetting plastics are generally preferred in pultrusion processes, in particular those with a high proportion of renewable raw materials, such as furan resin or itaconic acid resin.

Slats for furniture, for example, can be produced with pultrusion processes.

A method according to the invention that does not work with pultrusion but with a support layer, can comprise steps of:
a) providing the textile as a blank,
b) impregnating the textile with a polymer, resulting in an impregnated blank,
c) applying a soft overlay layer to the blank, wherein the overlay layer is applied to a surface of the blank on which the textile contained in the blank has a palpably inhomogeneous textile surface, wherein steps b and c can be carried out in any order,
d) subjecting the support layer to pressure such that the support layer is deformed in such a way that inhomogeneities of the surface of the impregnated blank are created which are caused by the textile structure,
e) strengthening the blank, for example hardening it, and
f) detaching the overlay layer.

In one embodiment, the process comprises steps of:
i) providing the textile as a blank,
ii) impregnating the textile with a polymer, thereby forming an impregnated blank, also referred to as a prepreg,
iii) applying a soft covering layer to the impregnated blank, wherein the covering layer is applied to a surface of the impregnated blank on which the textile contained in the blank has a palpably inhomogeneous textile surface,
iv) subjecting the support layer to pressure such that the support layer is deformed in such a way that inhomogeneities of the surface of the impregnated blank are created which are caused by the textile structure,
v) strengthening the blank, for example hardening it, and
vi) detaching the overlay layer.

In another embodiment, the method comprises steps of:
i) providing the textile as a blank,
ii) applying a soft overlay layer to the blank, wherein the overlay layer is applied to a surface of the textile on which the textile has a palpably inhomogeneous textile surface,
iii) impregnating the textile with a polymer, resulting in an impregnated blank,
iv) subjecting the support layer to pressure such that the support layer is deformed in such a way that inhomogeneities of the surface of the impregnated blank are created which are caused by the textile structure,
v) strengthening the blank, for example hardening it, and
vi) detaching the overlay layer.

The blank thus comprises at least one textile, preferably exactly one textile at the time of impregnation. Therefore, the blank is also at least a two-dimensional product. At a later stage of production, the blank also comprises a polymer. If the fiber composite plastic produced comprised several textiles that are impregnated separately from one another, the impregnated textiles are referred to as prepregs. Prepregs are preferably used within the scope of the method according to the invention, so that the product produced is a laminate. It is also possible to impregnate several textiles at the same time in one operation.

Impregnation is the process of impregnating the textile with polymer. This is usually done with a liquid polymer. Thermoset polymers in the form of meltable granules, meltable powders, meltable films, liquid polymer solutions, liquid polymer dispersions or liquid polymers are preferably used for impregnation.

The meltable granules or powder are melted and then soak the fiber material. In the case of liquid systems, the fiber materials are immediately saturated. Thermoplastic polymers, generally in the form of films, granules, powders, tapes, yarns or monofilaments, can also be used for impregnation. These polymers are melted and then impregnate the fiber material.

If the polymer is a thermoset, the resin may already be mixed with the hardener in a suitable ratio. Impregnation is possible, for example, manually with a squeegee, with padding or in an immersion bath, with a vacuum process or with a spraying process.

Before or after impregnation, a coating layer is placed on the blank. This also includes placing the overlay layer on the blank. The overlay layer is deformable or soft as a result of pressure exerted during the process. It is preferably applied to the blank without additional release agent. However, it is also possible to apply an additional release agent.

In the context of the invention, soft is understood to mean a low hardness, in particular a low Shore D hardness. This deformability or low hardness of the overlay layer ensures that the overlay layer is pressed against the laminate with the aid of appropriate pressure in such a way that the polymer enclosing the fibers of the textile is shaped in accordance with the inhomogeneities of the surface of the textile, giving the finished fiber composite plastic a palpably inhomogeneous surface, wherein inhomogeneities of this fiber composite plastic surface are caused by the textile structure.

In a preferred embodiment, the overlay layer has a Shore D hardness of 0-90, preferably a Shore D hardness of 50-75.

The overlay layer can have a thickness of, for example, 0.06-5 mm, preferably 0.08-0.4 mm. This thickness of the overlay layer ensures that the overlay layer is pressed against the blank with the aid of suitable pressure in such a way that the polymer enclosing the fibers of the textile shapes itself in accordance with the inhomogeneities of the surface of the textile, gives the finished fiber composite plastic a palpably inhomogeneous surface, wherein inhomogeneities of this fiber composite plastic surface are caused by the textile structure.

In a preferred embodiment, the soft support layer is elastic. The overlay layer is therefore deformed under load, i.e. when pressure is released. When the force causing the deformation, i.e. the pressure, is removed, the soft, elastic overlay layer can deform back to its original shape. This has the advantage that the overlay layer can be used several times and for different applications.

In one embodiment, the overlay layer comprises an elastomer, for example a natural rubber. The support layer may consist entirely of the elastomer, for example natural rubber, or it may be coated on a backing layer of another material.

In one embodiment, the overlay layer comprises Teflon, preferably a Teflon fabric. In this case, it is possible that the overlay layer consists entirely of a Teflon fabric or that a carrier layer made of another material is coated with Teflon or a Teflon fabric.

The overlay layer, which comprises Teflon or a Teflon fabric, preferably has a thickness of 0.08-0.4 mm and a Shore hardness D of 50-72.

In another embodiment, the support layer comprises silicone, preferably a fabric-reinforced silicone. In this case, it is possible for the overlay layer to consist entirely of a silicone or fabric-reinforced silicone, or for a carrier layer made of another material to be coated with silicone or fabric-reinforced silicone.

The overlay layer, which comprises of silicone or fabric-reinforced silicone, preferably has a thickness of 0.25-0.35 mm and a Shore hardness D of 0-46.

The materials mentioned can also be combined, e.g. a carrier layer of an elastomer with a coating of silicone or Teflon.

In one embodiment, the soft facing layer has at least one smooth surface that comes into contact with the blank. In this context, smooth means that the corresponding surface of the overlay layer does not have a height difference of 0.1 mm or more, preferably only height differences of approx. 1-10 µm. The smooth surface of the overlay layer gives the finished fiber composite plastic a glossy finish.

In one embodiment, the soft facing layer has at least one rough surface that comes into contact with the blank. Rough here means that the corresponding surface of the overlay layer has a height difference of more than 0.1 mm, preferably 0.1-1.0 mm. The rough surface of the overlay layer gives the finished fiber composite plastic a matte finish.

Advantageously, the support layer has a temperature resistance that makes it possible to withstand the temperatures occurring during hardening (in the case of thermosets, in the case of thermoplastics when the polymer is melted for impregnation), i.e. for example in the range of 0-250° C. or 100-200° C. or 120-180° C., so that the overlay layer can be used several times.

It is possible to place a soft overlay layer on each side of the blank. This leads, in particular, if both textile surfaces or—in the case of several textile layers—the respective outer textile layers have a palpably inhomogeneous textile surface, to both surfaces of the end product having palpably inhomogeneous surfaces.

If the product advantageously comprises several textiles, in particular several textile layers, these are preferably processed into prepregs and several prepregs are laminated. The layering of several layers of textile, preferably in the form of prepregs, can take place before or after or simultaneously with the application of the overlay layer, but before the application of pressure.

Prepregs are preferably used as polymers in thermosetting plastics. Prepregs are preferably dried before further processing, for example up to constant weight. This can be done, for example, in an oven at 80° C. In this step, the conditions should be selected so that no hardening or curing takes place yet for thermosetting plastics.

Prepregs can also be used for thermosetting plastics. In one embodiment, the polymers are solidified before further processing, for example by lowering the temperature. To laminate several prepregs, the temperature can then be increased again until the polymer melts.

Any number of laminate layers can be arranged one on top of the other in any orientation, based on the fiber orientation in the individual layers, for example 2-100, 3-80, 4-50, 5-20, 6-15, 7-10 or 8-9. It should be noted, however, that only one or both outer laminate layers, i.e. those laminate layer(s) which are to produce a palpably inhomogeneous surface in the finished fiber composite plastic, are provided with an overlay layer as described in step c. In this case, the inner layers are merely impregnated, as described in Step b, and processed further without a support layer, i.e. layered on top of one another and generally hardened together.

Pressure is applied after the application of the overlay layer. This is preferably done in a mold. In this context, the term "tool" refers to closed or semi-closed molds which can be used to specify the final geometry of the component. However, the molding tools can also be designed such that the finished fiber composite plastic is in the form of sheets or the like, which can then be further processed into a component or article. For example, to produce fiber composite plastic panels, a tool can be used which includes panels, for example made of glass or metal, above and below the blank (including the overlay layer or layers), which do not deform or do not deform significantly under pressure.

The purpose of pressurization is, on the one hand, to squeeze out trapped air and to squeeze out excess resin. On the other hand, the pressure that is applied presses the soft support layer against the laminate in such a way that the polymer, which encloses the fibers of the textile, is shaped according to the inhomogeneities of the surface of the textile, wherein the finished fiber composite plastic receives a palpably inhomogeneous surface, wherein inhomogeneities of this fiber composite plastic surface are caused by the textile structure.

The pressure can be applied either in the form of positive or negative pressure. The pressure is preferably applied over the entire surface of the blank.

Overpressure can be e.g. 0.1-250 bar, preferably 1-15 bar. At negative pressure, the resulting pressure corresponds to a value of −0.01 to −1.0 bar, preferably −0.1 to −0.5 bar. In this case, the hardness of the soft support layer and the pressure are advantageously matched to one another in such a way that the desired result is achieved.

In fully or partially manual processes, the pressure can be partially applied manually, for example using a roller, screw clamps, quick clamps or weights. Fully or partially automated processes can also be used.

The next step is to solidify the blank. In the case of a thermosetting plastic, the blank is hardened in the process. Hardening serves to crosslink the polymer, i.e. the bedding matrix. The hardening step involves heating the laminate on the one hand and applying pressure on the other. For example, during heating, temperatures ranging from room temperature, i.e. 25-200° C., preferably 80-175° C. or 100-150° C. are used for a few minutes (1 or more minutes) up to 12 h, depending on the polymer used as bedding matrix. The actual crosslinking of the polymer takes place through hardening. Heating is usually followed by cooling. During cooling, it is advantageous if the pressure that was applied during hardening is maintained in whole or in part (e.g. approx. 10 bar) in order to minimize stresses in the fiber composite plastic. It is possible to cool a press used for curing under pressure or to transfer the fiber composite plastic to another press or between other plates.

The method according to the invention preferably consists of a method for laminating selected from the group consisting of hand lamination, hot pressing, wet pressing, vacuum bag methods, injection methods and subtypes, gap impregnation, high pressure pressing, continuous laminating, centrifugal methods, automated layering methods, winding and autoclave methods.

In the case of a thermoplastic, the temperature for solidification is lowered so that the previously melted polymer solidifies.

After solidification, the overlay layer is removed. This can be removed easily and without leaving residues due to its surface properties. No additional release agent is required here. The fact that the overlay layer can be easily detached without leaving any residue and without additional release agent means that the overlay layer can be reused as often as required and the amount of work is minimized because there is no need for additional application and subsequent removal of release agent.

As an alternative to the preferred method described above, fiber composite plastics according to the invention can also be produced without a soft overlay layer and application of pressure thereto, if the ratio of polymer and textile is selected in such a way that the textile is almost completely or preferably completely wetted with polymer, and a palpably inhomogeneous surface of the fiber composite plastic is formed by thermal (and in the case of thermosets also reactive) shrinkage, wherein inhomogeneities in this fiber composite plastic surface are caused by the textile structure. In this embodiment, too, the polymers are preferably thermosetting plastics.

The invention therefore provides for the first time the use of textile waste or in particular old textiles for the production of a fiber composite plastic, for example a fiber composite plastic according to the invention. Preferably, old textiles such as clothing (e.g., trousers, shirt, underwear) or sacks (e.g., bags made of coarse fibers, e.g., jute, such as coffee sacks) or carpet (e.g., rag rug), are used to produce a fiber composite plastic, e.g., a fiber composite plastic according to the invention.

In a further preferred embodiment, the invention uses a soft overlay layer as defined herein for the manufacture of a fiber composite plastic, in particular a fiber composite plastic according to the invention.

In one embodiment, the at least one palpably inhomogeneous surface of the fiber composite plastic additionally is optically inhomogeneous, wherein the surface preferably also exhibits color inhomogeneities. These color inhomogeneities are preferably also characterized by the color inhomogeneities of the textile (for example a patchwork quilt or a sack with a print). In this embodiment, therefore, polymers that are translucent or transparent in the fiber composite plastic are preferred.

These polymers may or may not be colorless.

Preferred further embodiments of the invention are explained in more detail by the following description of the figures and examples. These are not intended to limit the invention.

DETAILED DESCRIPTION OF PREFERRED EMBODIMENTS

Preferred exemplary embodiments are described below, for example with reference to the figures.

Elements that are the same, similar or have the same effect are provided with identical reference symbols in the different figures, and a repeated description of these elements is partially omitted in order to avoid redundancies.

Figure 1:
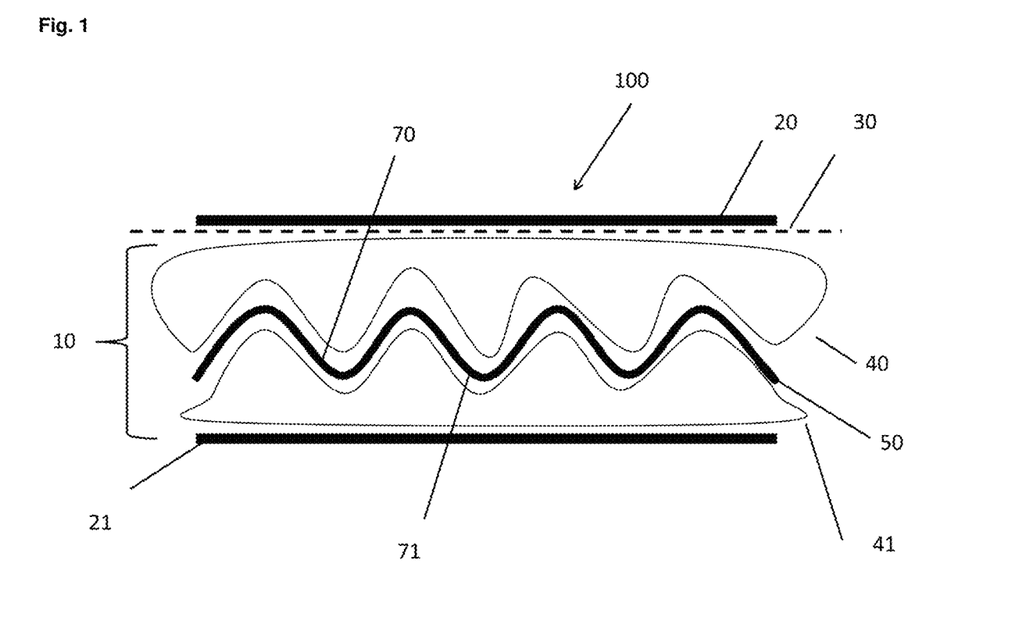
FIG. 1 shows a textile layer 50, a polymer 40, 41 and a soft support layer 30 in a tool 100 before the application of pressure $p_{01}$.

FIG. 1 shows a textile layer 50, a polymer 40, 41 and a soft overlay layer 30 in a mold 100 before applying pressure $p_{01}$, In this case, the blank 10 corresponds to a textile layer 50 and a polymer 40, 41.

The textile 50 has two palpably inhomogeneous surfaces 70, 71. The blank 10 is placed between the top surface 40 and the bottom surface 41 of a tool 100. A soft covering layer 30 is placed on the upper side of the blank 10.

Figure 2:
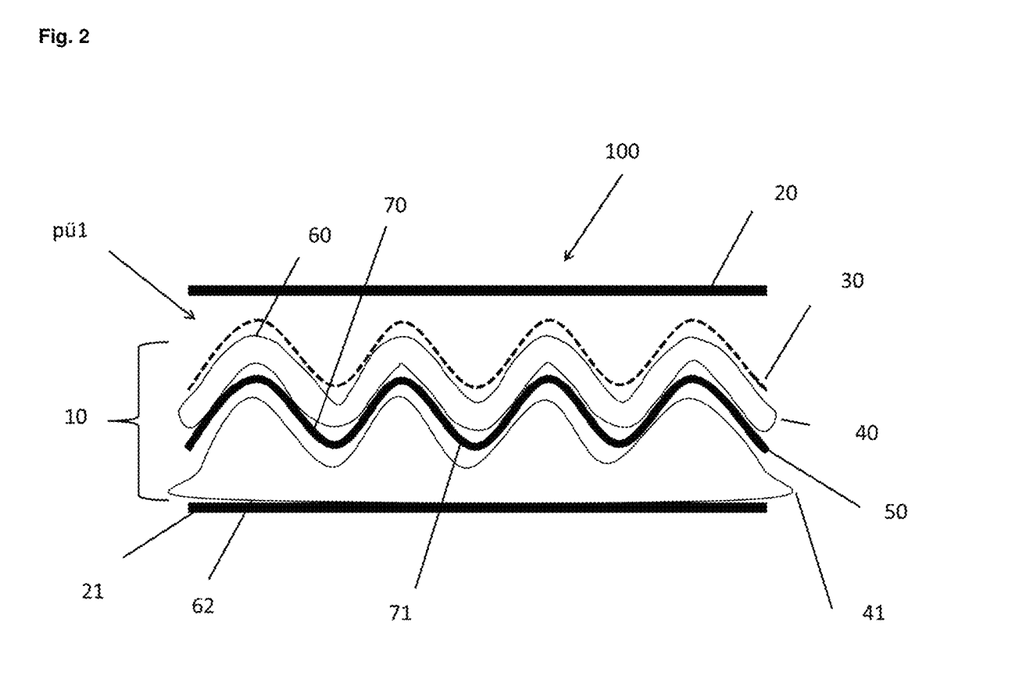
FIG. 2 shows a textile layer 50, a polymer 40, 41 and a soft support layer 30 in a tool 100 after pressure $p_{01}$ has been applied.

FIG. 2 shows a textile layer 50, a polymer 40, 41 and a soft support layer 30 in a tool 100 after pressure $p_{01}$ has been applied. Here, the overlay layer 30 is subjected to a pressure $p_{01}$ by pressure on the upper surface 20 of the mold 100. Alternatively, the pressure may be applied to the lower surface 21 of the tool 100. This presses the overlay layer against the blank in such a way that the part of the polymer 40 which covers the textile 50 or the palpably inhomogeneous surface 70 of the textile 50 is formed in such a way that an inhomogeneous surface 60 is produced, wherein inhomogeneities of this fiber composite surface are caused by the textile structure, i.e. by the palpably inhomogeneous surface 70 of the textile 50. The part of the polymer 41 that covers the lower, palpably inhomogeneous surface 71 of the textile 50 is shaped according to the tool 100 used or the lower surface 21 of the tool 100.

Figure 3:
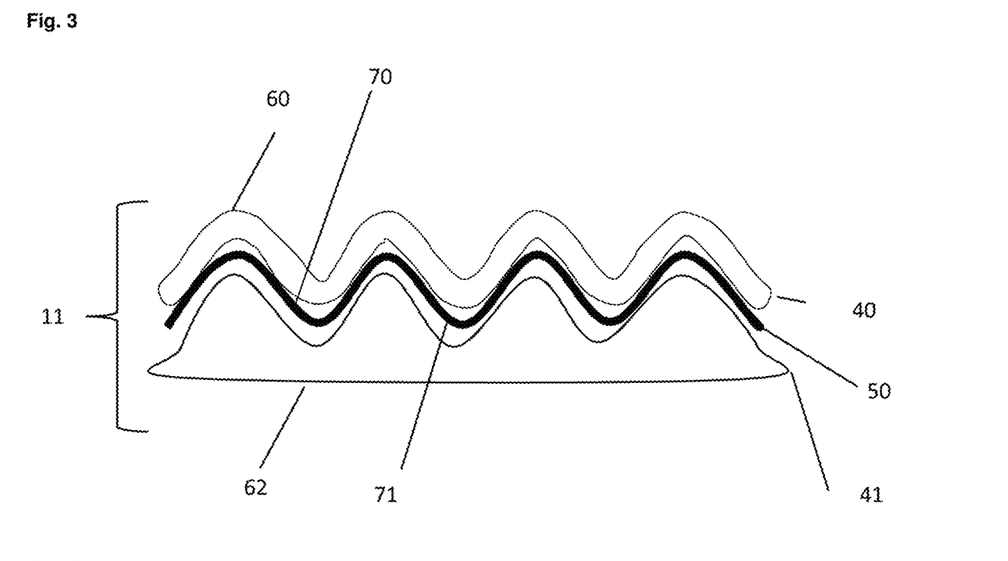
FIG. 3 shows the finished fiber composite plastic 11 with a palpably inhomogeneous surface 60.

FIG. 3 shows the finished fiber composite plastic 11 with two surfaces 60, 62 after cooling and removal of the overlay layer 30. In this case, the palpably inhomogeneous surface 60 has inhomogeneities 60 which are caused by the palpably inhomogeneous surface 70 of the textile 50. The surface 62 does not have any inhomogeneities which are caused by the palpably inhomogeneous surface 71 of the textile 50, but has a surface 62 which results from the surface properties of the lower surface 21 of the tool 100. In this case, it is homogeneous, or smooth.

Within the scope of the invention, it is possible to produce fiber composite plastics in which the surface 62 of the fiber composite plastic 11 has inhomogeneities which are not caused by the inhomogeneous surface 71 of the textile 50.

Figure 4:
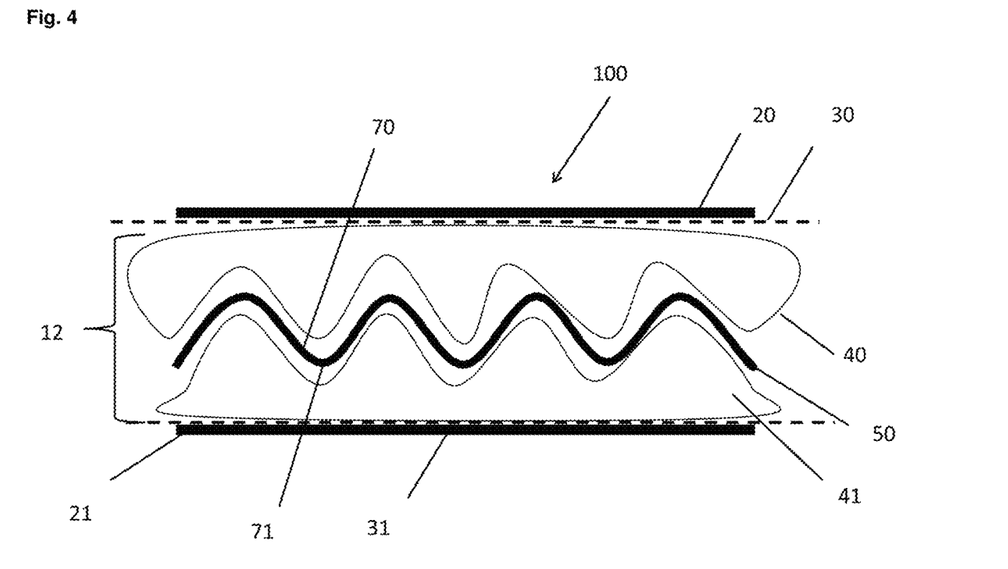
FIG. 4 shows a textile layer 50, a polymer 40, 41 and two soft support layers 30, 31 in a tool 100 before the application of pressure $p_{01}$, $p_{02}$.

FIG. 4 shows a textile layer 50, a polymer 40, 41 and two soft overlay layers 30, 31 in a mold 100 before applying pressure $p_{01}$, $p_{02}$. The textile 50 has two palpably inhomogeneous surfaces 70, 71. The blank 12 corresponds to a textile layer 50 and a polymer 40, 41. Here, the blank 12 is positioned between the upper surface 20 and the lower surface 21 of a tool 100. A first soft overlay layer 40 is placed on the upper side of the blank 12, and a second soft overlay layer 41 is placed on the lower side of the blank 12.

Figure 5:
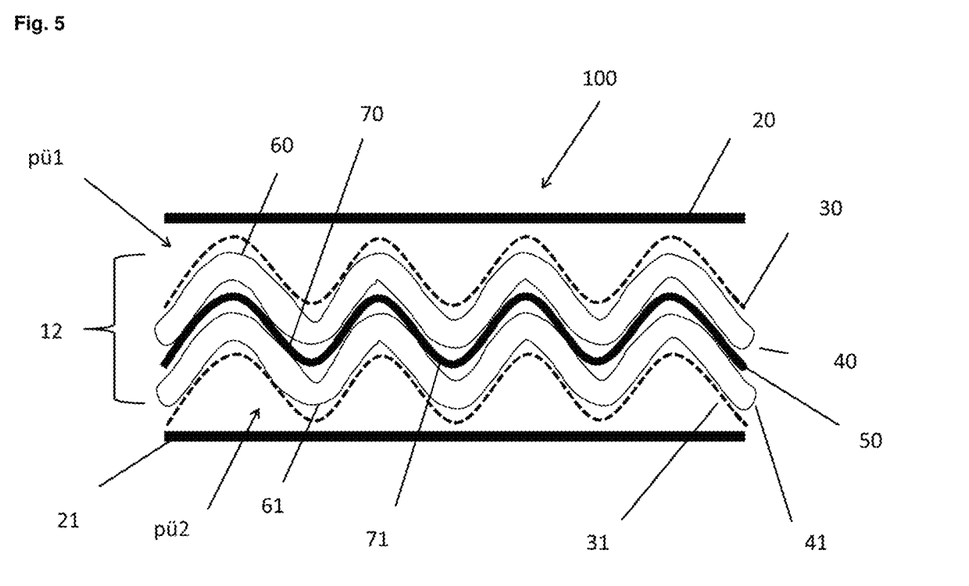
FIG. 5 shows a textile layer 50, a polymer 40, 41 and two soft overlay layers 30, 31 in a mold 100 after applying pressure $p_{01}$, $p_{02}$.

FIG. 5 shows a textile layer 50, a polymer 40, 41 and two soft overlay layers 30, 31 in a mold 100 after applying pressure $p_{01}$, $p_{02}$. Here, the overlay layer 30 is subjected to a pressure $p_{01}$ by the upper surface 20 of the mold 100. Alternatively (or additionally), the pressure $p_{02}$ can also be applied to the lower surface 21 of the tool 100. As a result, the overlay layers 30, 31 are pressed against the blank 12 in such a way that the polymer 40, 41 covering the two palpably inhomogeneous surfaces 70, 71 of the textile 50 is shaped in such a way that inhomogeneous surfaces 60, 61 are formed, wherein inhomogeneities are caused by the palpably inhomogeneous surfaces 70, 71 of the textile 50.

Figure 6:
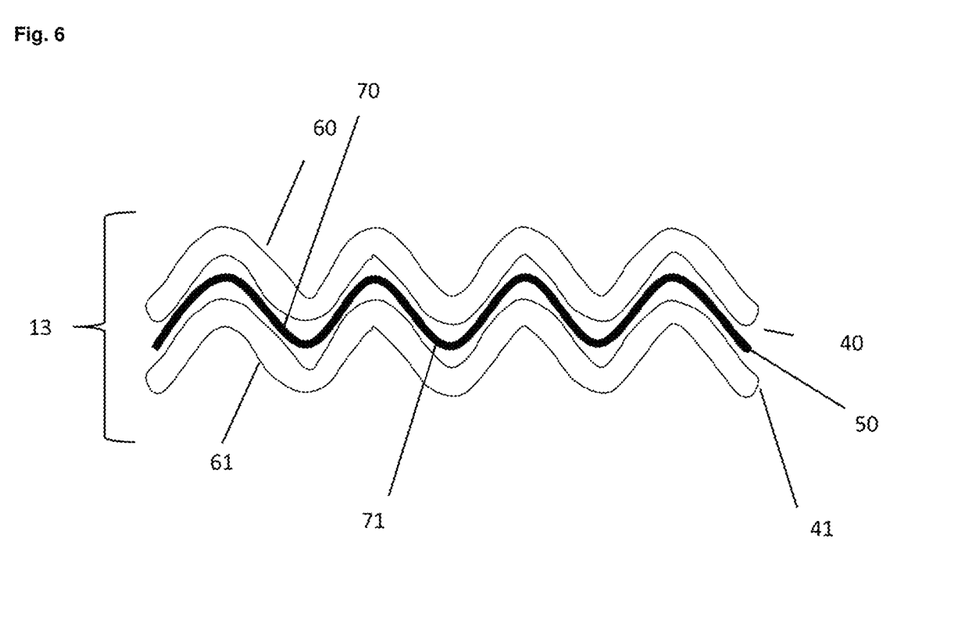
FIG. 6 shows the finished fiber composite plastic 13 with a palpably inhomogeneous surface 60, 61.

In FIG. 6, the finished fiber composite 13 is shown with two palpably inhomogeneous surfaces 60, 61 after cooling and removal of the overlay layers 30, 31. The palpably inhomogeneous surfaces 60, 62 exhibit inhomogeneities caused by the palpably inhomogeneous surfaces 70, 71 of the textile 50.

Figure 7:
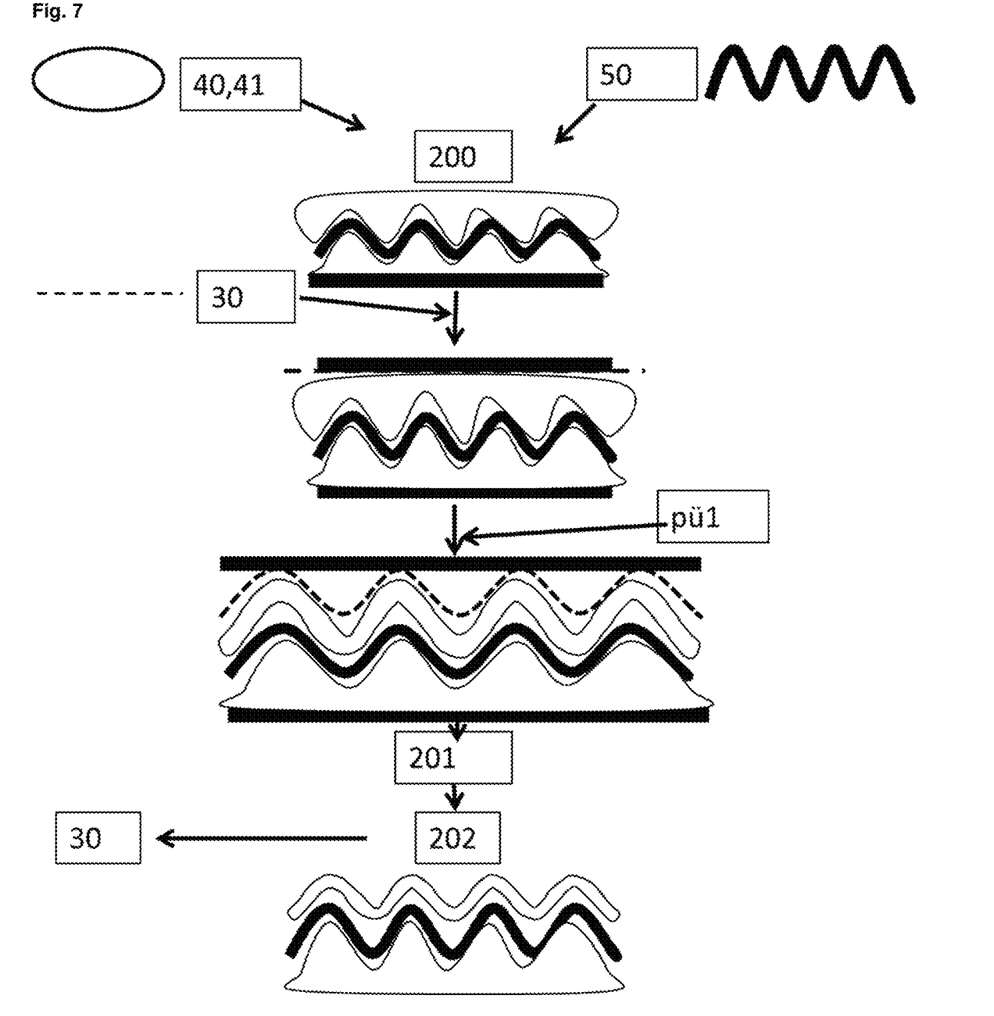
FIG. 7 shows a schematic overview of a process according to the invention for the production of a fiber composite plastic.

FIG. 7 shows a schematic overview of a process according to the invention for the production of a fiber composite plastic. Here, in a first step of impregnation 200, the textile 50 is impregnated with the polymer 40, 41, i.e., brought into contact with each other, resulting in an impregnated blank 10. In a second step, a soft overlay layer 30 is placed on a surface of the blank 10. In the next step, the support layer 30 is subjected to a pressure μm, by the upper surface of the tool 100. This presses the overlay layer against the blank in such a way that the part of the polymer 40 covering the palpably inhomogeneous surface 70 of the textile 50 is formed in such a way that an inhomogeneous surface 60 is produced, wherein inhomogeneities of this blank surface are caused by the palpably inhomogeneous surface 70 of the textile 50. The next step is to harden 201 the blank 10 into a fiber composite plastic.

In this process, crosslinking of the polymer 40, 41 takes place, resulting in a fiber composite plastic 11.

Finally, the fiber composite plastic is cooled 202 and the overlay layer 30 is removed. The process described in FIG. 7 produces a fiber composite plastic 11 that has a palpably inhomogeneous surface 60, which has inhomogeneities 60 caused by the palpably inhomogeneous surface 70 of the textile 50.

In this case, the surface 62 does not have any inhomogeneities which are caused by the palpably inhomogeneous surface 71 of the textile 50, but it is homogeneous, or smooth, i.e. it has a surface 62 which is caused by the surface properties of the lower surface 21 of the tool 100. However, it is also possible that the surface 62 of the fiber composite plastic 11 has inhomogeneities that are not caused by the textile structure 50.

Figure 8:
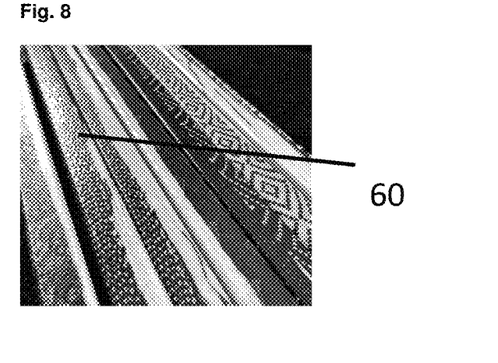
FIG. 8 shows an image of a fiber composite plastic produced according to embodiment 7.

FIG. 8 is the finished fiber composite plastic with palpably inhomogeneous surfaces 60 after pultrusion and cooling. The palpably inhomogeneous surfaces 60 exhibit inhomogeneities caused by the palpably inhomogeneous surfaces of the textile.

Further preferred exemplary embodiments are described below.

Example 1 (Decor Panel, 2 mm Thick)

A used coffee sack comprising a jute fiber fabric with a basis weight of 417 g/m$^2$ was stripped of the seams all around. It was then cut into squares with a width of 50 cm. These layers were impregnated by hand with a furan resin consisting of 95% Furolite 120514 RF DAC MV (resin) and 4.8% PAT 6399 (hardener) such that the amount of resin based on the weight of the textile is 1.26. The prepreg was then dried in an oven at 80° C. to constant weight. The same was done with a used old towel comprising cotton fabric. Since the towel layers are only 25 cm wide, they were sewn together end to end. The basis weight of the textile is 218 g/m$^2$ and the amount of resin is also 1.26 times the weight of the textile. After drying, 1 layer of coffee sack prepreg, then 2 layers of towel prepreg and finally 1 layer of coffee sack prepreg were stacked on top of each other. This layer structure was placed between 2 steel plates in a hot press at 150° C. and pressed at 2 mm distances for 10 minutes. The plate was then quickly removed from the press and cooled to room temperature under pressure. The plate has a flexural strength of 90 MPa at 0° and 85 MPa at 90°.

Example 2 (Visible Plate, Thick)

A patchwork quilt consisting of selvedges with a basis weight of 1.5 kg/m² is placed on a glass plate.

The glass plate is separated beforehand with a release agent, Jost Chemicals Mold Sealer S-31. A tear-off fabric is placed on the patchwork quilt and a flow aid is placed over it. The entire structure is sealed with Tacky Tape running around the glass plate and a vacuum foil bag placed over it. A vacuum is then drawn and then infused with the RIM resin from Lange+Ritter. The resin consists of RIMR 935 (resin) and the hardener RIMH 936 in a mixing ratio of 100:29. After the part is completely infused, it is hardened in an oven at 80° C. for 14 hrs. The component is then demolded and the peel ply removed.

Example 3 (Profile)

For a round profile with a diameter of 8 mm, selvedges consisting of cotton and polyester were trimmed so that they have a titer of 3650 tex. 6 of these edges were processed into the profile by pultrusion. An unsaturated itaconic acid resin consisting of 86.2% itaconic acid ester (resin), 8.6% dibutylitaconate (reactive diluent), 1.7% PAT 654 ME (release agent) and 3.5% tert-butyl perbenzoate was used as matrix resin. The impregnation was carried out in an immersion bath. Hardening was performed in the mold at 175° C.

The bars have a flexural strength of 200 MPa at 0°.

Example 4 (Molded Part, Here Shaft Plate)

A used cotton curtain with a basis weight of 238 g/m² was cut into rectangular areas, with a width of 50 cm. These layers were impregnated with the furan resin, consisting of 97.7% Furolite 120514 RF DAC MV (resin) and 2.3% PTSA (hardening agent) with padding such that the amount of resin based on textile weight was 1.26. The prepreg was then dried in an oven at 80° C. to constant weight. The same was done with a used old towel comprising cotton fabric. Since the towel layers are only 25 cm wide, they were sewn together end to end. The basis weight of the textile is 218 g/m² and the amount of resin is also 1.26 times the textile weight. After drying, 1 layer of cotton curtain, 1 layer of prepreg towel, 1 layer of cotton curtain, 1 layer of prepreg towel and finally 1 layer of cotton curtain again were stacked. This layer structure was placed between 2 shaft tools made of aluminum and pressed in a hot press at 150° C. for 10 min at 2 mm distances. The corrugated plate was then cooled to room temperature under pressure.

The material has a bending strength of 110 MPa at 0° and 130 MPa at 90°.

Example 5 (Decor Panel, 2 mm Thick)

A discarded bed sheet from a hospital with a basis weight of 240 g/m² was cut into rectangular panels with a width of 50 cm after the seam had been removed. These layers were impregnated with the furan resin, consisting of 95% Furolite 120514 RF DAC MV (resin) and 4.8% PAT 6399 (hardener) by means of a doctor blade in such a way that the amount of resin based on the textile weight is 1.26. The prepreg was then dried in an oven at 80° C. to constant weight. The same was done with a used old towel comprising cotton fabric. Since the towel layers are only 25 cm wide, they were sewn together end to end. The basis weight of the textile is 218 g/m² and the amount of resin is also 1.26 times the textile weight. After drying, 1 layer of cotton curtain, 1 layer of prepreg towel, 1 layer of cotton curtain, 1 layer of prepreg towel and finally 1 layer of cotton curtain again were stacked. On the outermost layer was laid a dry auger of cotton and flax yarn. This layer structure was placed between 2 steel plates in a hot press at 150° C. and pressed at 2 mm distances for 10 minutes. The plate was then quickly removed from the press and cooled to room temperature under pressure.

The material has a bending strength of 110 MPa at 0° and 130 MPa at 90°.

Example 6 (Thick Plate)

A light-colored fleece, consisting of pressed fibers with a high cotton content from used textiles, with a basis weight of 165 g/m² is cut into rectangular areas with a width of 50 cm. These layers are impregnated with the furan resin, consisting of 95% Furolite 120514 RF DAC MV (resin) and 4.8% PAT 6399 (hardener) by means of padding in such a way that the amount of resin relative to the weight of the textile is 1.26. The prepreg is then dried in an oven at 80° C. until its weight is constant. The same happens with used coffee sacks consisting of a jute fiber fabric with a basis weight of 417 g/m². This is cleaned from the seams all around. In addition, a used old towel roll, consisting of cotton fabric is used. Since the towel layers are only 25 cm wide, they are sewn together end to end. The basis weight of the textile is 218 g/m² and the amount of resin is also 1.26 times the textile weight. After drying, 1 coffee sack prepreg, 1 layer of towel prepreg, 1 layer of coffee sack prepreg, 1 layer of towel prepreg, 68 layers of fleece prepreg, 1 layer of towel prepreg, 1 layer of coffee sack prepreg, 1 layer of towel prepreg and finally 1 layer of coffee sack prepreg are layered on top of each other. This layer structure is placed between 2 steel plates in a hot press at 150° C. and pressed at a distance of 20 mm for 100 minutes.

The plate is then cooled to room temperature under pressure.

Example 7 (Thick Profile)

A total of 40 flax yarns with a titer of 1000 tex each, 48 jute yarns with a titer of 830 tex each, 22 black cotton recycled yarns with a titer of 800 tex each, 28 white cotton recycled yarns with a titer of 800 tex each, 6 coconut colored cotton recycled yarns with a titer of 800 tex each, 2 selvedges of cotton with a titer of 4300 tex each, white textile strips from different waste textiles with a titer 10,500 tex and black dyed textile strips made of various waste textiles with a titer of 10,500 tex, prepared for a square profile with an edge length of 16 mm. An unsaturated itaconic acid resin consisting of 86.2% itaconic acid ester (resin), 8.6% dibutylitaconate (reactive diluent), 1.7% PAT 654 ME (release agent) and 3.5% tert-butyl perbenzoate was used as matrix resin. The impregnation was carried out in an immersion bath. Hardening was performed in the mold at 170° C.

The bars have a flexural strength of 250 MPa at 0°.

To the extent applicable, any of the individual features shown in the description and/or embodiments may be combined and/or interchanged without departing from the scope of the invention.

REFERENCE LIST 10, 12 Blank
11 Fiber composite plastic with a palpably inhomogeneous surface
13 Fiber composite plastic with two palpably inhomogeneous surfaces
Upper surface of a tool
21 Lower surface of a tool
30, 31 Overlay layer
40, 41 Polymer
50 Textile layer
60, 61 palpably inhomogeneous surface of the fiber composite plastic
62 Smooth surface of the fiber composite plastic
70, 71 palpably inhomogeneous surface of the textile
100 Tool
200 Laminate
201 Hardening
202 Cooling
$p_{01}$, $p_{02}$ Pressure

The invention claimed is:

1. A fiber composite plastic (11, 13) comprising a polymer (40, 41) and at least one textile (50) having at least one palpably inhomogeneous textile surface (70, 71) with a textile structure and being completely enclosed by the polymer (40, 41),
    wherein the polymer is a thermoset,
    wherein the fiber composite plastic (11, 13) has at least one palpably inhomogeneous fiber composite plastic surface (60, 61), inhomogeneities of said fiber composite plastic surface being caused by the textile structure,
    wherein the textile does not comprise carbon fibers,
    wherein the textile structure results from a weave, knit, braided, crocheted, or embroidered pattern, and
    wherein the fiber composite plastic surface (60, 61) has an inhomogeneity with a plurality of height differences of at least 0.01 mm and an arithmetic average of a roughness profile $R_a$ of at least 10 μm, wherein the fiber composite plastic has a flexural strength of at least 30 MPa.

2. The fiber composite plastic (11, 13) according to claim 1, wherein the textile (50) is selected from the group consisting of a used textile and textile waste.

3. The fiber composite plastic (11, 13) according to claim 1, wherein the inhomogeneity has an arithmetic average of the roughness profile Ra of at least 25 μm.

4. The fiber composite plastic (11, 13) according to claim 1, wherein the textile (50) is selected from the group consisting of woven fabrics, knitted fabrics, braided fabrics and scrims.

5. The fiber composite plastic (11, 13) according to claim 1, wherein the fiber composite plastic (11, 13) comprises a plurality of identical or different textiles (50), which are optionally connected to one another by a binding process selected from the group consisting of sewing, gluing, welding and ironing.

6. The fiber composite plastic (11, 13) according to claim 1, wherein the textile (50) comprises natural fibers.

7. The fiber composite plastic (11, 13) according to claim 1, wherein the fiber composite plastic (11, 13) further comprises reinforcing fibers.

8. The fiber composite plastic (11, 13) according to claim 1, wherein the textile (50) increases the flexural strength of the fiber composite plastic (11, 13).

9. The fiber composite plastic (11, 13) according to claim 1, wherein the fiber volume content is 25-75% V/V.

10. The fiber composite plastic (11, 13) according to claim 1, in which the amount of polymer (40, 41) is 25-75% % V/V.

11. The fiber composite plastic (11, 13) according to claim 1, wherein the fiber composite plastic is produced using pultrusion.

12. The fiber composite plastic (11, 13) according to claim 1, wherein the textile consists of natural fibers and/or man-made fibers made from natural or synthetic polymers.

13. The fiber composite plastic (11, 13) according to claim 1, wherein the fiber composite plastic simultaneously fulfills a stability or carrying function and a design function and no additional decorative layer is applied.

14. The fiber composite plastic (11, 13) according to claim 1, wherein the textile has a plurality of height differences of at least 0.05 mm.

15. A method of making the fiber composite plastic (11, 13) according to claim 1, comprising steps of:
    a) providing the textile (50) as a blank (10, 12),
    b) impregnating the textile (50) with a polymer (40, 41), resulting in an impregnated blank (10, 12),
    c) applying a soft overlay layer (30, 31) to the blank (10, 12), wherein the overlay layer (30, 31) is applied to a surface of the blank (10, 12) at which the textile (50) contained in the blank (10, 12) has a palpably inhomogeneous textile surface (70, 71), wherein steps b and c can be carried out in any order,
    d) subjecting the overlay layer (30, 31) to pressure such that the overlay layer (30, 31) is deformed to produce inhomogeneities of the surface of the impregnated blank (10, 12) caused by the textile structure,
    e) solidifying the blank, and
    f) detaching the overlay layer (30, 31).

16. The method according to claim 15, wherein a plurality of prepregs produced by steps a and b are laminated to produce the fiber composite plastic (11, 13).

17. Use of waste textiles and/or textile waste for production of the fiber composite plastic (11, 13) according to claim 1.

18. Use of a soft overlay layer (30, 31) for production of the fiber composite plastic (11, 13) according to claim 1.

19. A furniture element comprising the fiber composite plastic according to claim 1.

20. A flooring element comprising the fiber composite plastic according to claim 1.

21. An interior design element comprising the fiber composite plastic according to claim 1.

* * * * *